(12) United States Patent
Fahrny et al.

(10) Patent No.: US 7,970,132 B2
(45) Date of Patent: Jun. 28, 2011

(54) REDUCED HIERARCHY KEY MANAGEMENT SYSTEM AND METHOD

(75) Inventors: James William Fahrny, Pueblo, CO (US); Charles L. Compton, Bryn Mawr, PA (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 0 days.

(21) Appl. No.: 12/255,101

(22) Filed: Oct. 21, 2008

(65) Prior Publication Data
US 2009/0052661 A1 Feb. 26, 2009

Related U.S. Application Data

(63) Continuation of application No. 10/914,478, filed on Aug. 9, 2004.

(51) Int. Cl.
*H04L 9/00* (2006.01)
(52) U.S. Cl. ......... 380/42; 380/239; 380/212; 380/227; 380/201; 380/228; 380/282; 380/231; 380/223; 380/210; 380/44; 380/37; 380/277; 380/278; 380/200; 380/264; 713/193; 713/189; 713/176; 726/26; 725/1; 725/2; 725/3; 725/4; 725/25; 725/26; 725/27; 725/28; 725/29; 725/30; 725/31; 725/63; 725/67; 725/68; 725/86; 725/87; 725/100; 725/135; 725/138; 725/139; 725/143; 725/144; 725/151; 725/105; 725/110
(58) Field of Classification Search .................. 380/42, 380/239, 212, 227, 201, 228, 282, 231, 223, 380/210, 44, 37, 277, 278, 200, 264; 713/193, 713/189, 176; 726/26; 725/1–4, 25–31, 725/63, 67, 68, 86, 87, 100, 135, 138, 139, 725/143, 144, 151, 105, 110
See application file for complete search history.

(56) References Cited

U.S. PATENT DOCUMENTS
4,792,973 A * 12/1988 Gilhousen et al. ............ 380/231
(Continued)

FOREIGN PATENT DOCUMENTS
EP 0969667 A2 7/1999
(Continued)

OTHER PUBLICATIONS

Supplementary European Search Report for Application No. 05775720-5 mailed Aug. 19, 2010.
(Continued)

*Primary Examiner* — Christopher J Brown
*Assistant Examiner* — Canh Le
(74) *Attorney, Agent, or Firm* — Banner & Witcoff, Ltd.

(57) ABSTRACT

A controller receives an encrypted media stream ("EMS") and an identifier indicative of a selected content key from a headend. The EMS is encrypted with an encryption key and can be decrypted with a corresponding decryption key which is determinable from the selected content key. The controller receives indexes and content keys from the headend prior to receiving the EMS. Each index respectively corresponds to an identifier with one index corresponding to the identifier indicative of the selected content key. The content keys correspond to the indexes with one content key corresponding to the index corresponding to the identifier indicative of the selected content key. The controller selects the index corresponding to the identifier indicative of the selected content key upon receiving the EMS, determines the selected content key from the selected index, determines the decryption key from the selected content key, and decrypts the EMS with the decryption key.

31 Claims, 6 Drawing Sheets

U.S. PATENT DOCUMENTS

| | | | |
|---|---|---|---|
| 4,860,353 A * | 8/1989 | Brown | 380/44 |
| 5,054,067 A * | 10/1991 | Moroney et al. | 380/37 |
| 5,671,276 A | 9/1997 | Eyer et al. | |
| 5,734,720 A | 3/1998 | Salganicoff | |
| 5,784,095 A | 7/1998 | Robbins et al. | |
| 5,982,363 A | 11/1999 | Naiff | |
| 6,157,719 A | 12/2000 | Wasilewski et al. | |
| 6,271,837 B1 | 8/2001 | Naiff | |
| 6,373,948 B1 * | 4/2002 | Wool | 380/241 |
| 6,424,717 B1 | 7/2002 | Pinder et al. | |
| 6,738,905 B1 * | 5/2004 | Kravitz et al. | 713/194 |
| 6,748,080 B2 * | 6/2004 | Russ et al. | 380/239 |
| 6,898,285 B1 * | 5/2005 | Hutchings et al. | 380/200 |
| 6,976,163 B1 | 12/2005 | Hind et al. | |
| 7,065,213 B2 * | 6/2006 | Pinder | 380/240 |
| 7,069,452 B1 | 6/2006 | Hind et al. | |
| 2001/0046299 A1 | 11/2001 | Wasilewski et al. | |
| 2002/0090090 A1 * | 7/2002 | Van Rijnsoever et al. | 380/279 |
| 2002/0101990 A1 * | 8/2002 | Morino et al. | 380/210 |
| 2002/0118837 A1 | 8/2002 | Hamilton | |
| 2002/0136406 A1 | 9/2002 | Fitzhardinge et al. | |
| 2002/0170054 A1 | 11/2002 | Kudelski et al. | |
| 2003/0002577 A1 * | 1/2003 | Pinder | 375/240.01 |
| 2003/0068047 A1 * | 4/2003 | Lee et al. | 380/278 |
| 2003/0097655 A1 | 5/2003 | Novak | |
| 2003/0123667 A1 * | 7/2003 | Weber et al. | 380/277 |
| 2003/0152235 A1 * | 8/2003 | Cohen et al. | 380/278 |
| 2003/0190044 A1 * | 10/2003 | Higashi et al. | 380/201 |
| 2003/0219127 A1 | 11/2003 | Russ et al. | |
| 2004/0057579 A1 | 3/2004 | Fahrny | |
| 2004/0083177 A1 * | 4/2004 | Chen et al. | 705/50 |
| 2004/0098591 A1 | 5/2004 | Fahrny | |
| 2004/0177369 A1 * | 9/2004 | Akins, III | 725/31 |
| 2004/0208316 A1 | 10/2004 | Wack et al. | |
| 2005/0010778 A1 | 1/2005 | Walmsley | |
| 2005/0021985 A1 * | 1/2005 | Ono et al. | 713/193 |
| 2005/0100161 A1 * | 5/2005 | Husemann et al. | 380/200 |
| 2005/0119967 A1 * | 6/2005 | Ishiguro et al. | 705/38 |
| 2005/0169468 A1 | 8/2005 | Fahrny et al. | |
| 2005/0177741 A1 * | 8/2005 | Chen et al. | 713/189 |
| 2006/0122946 A1 | 6/2006 | Fahrny et al. | |
| 2006/0137015 A1 | 6/2006 | Fahrny et al. | |
| 2006/0153379 A1 | 7/2006 | Candelore et al. | |
| 2006/0184796 A1 | 8/2006 | Fahrny | |
| 2006/0200412 A1 | 9/2006 | Fahrny et al. | |
| 2006/0274898 A1 * | 12/2006 | Pedlow, Jr. | 380/277 |
| 2007/0064951 A1 | 3/2007 | Unger | 380/277 |
| 2007/0242829 A1 * | 10/2007 | Pedlow | 380/277 |

FOREIGN PATENT DOCUMENTS

| | | |
|---|---|---|
| EP | 0969667 A2 | 1/2000 |
| EP | 1241873 A1 | 9/2002 |
| EP | 1418750 A1 | 5/2004 |
| JP | 2000-196586 A | 7/2000 |
| JP | 2000196586 A | 7/2000 |
| JP | 2003-110549 A | 4/2003 |
| JP | 2003-264813 A | 9/2003 |
| WO | 9746008 A1 | 12/1997 |

OTHER PUBLICATIONS

European Search Report dated Aug. 19, 2010.

* cited by examiner

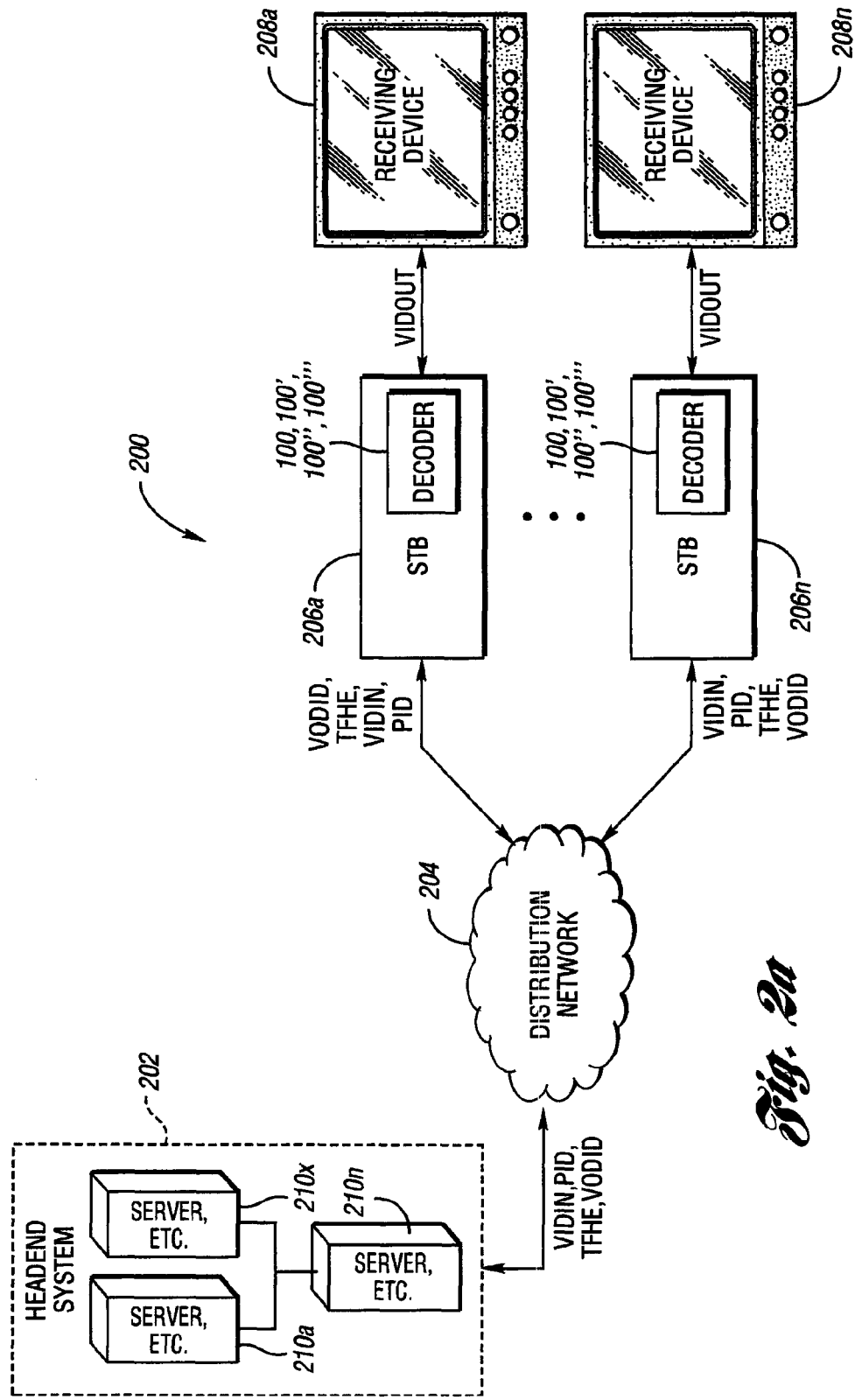

REDUCED HIERARCHY KEY MANAGEMENT SYSTEM AND METHOD

CROSS-REFERENCE TO RELATED APPLICATIONS

This application is a continuation of U.S. application Ser. No. 10/914,478, filed Aug. 9, 2004, which is hereby incorporated by reference.

BACKGROUND OF THE INVENTION

1. Field of the Invention

The present invention relates to a system and method for reduced hierarchy key management.

2. Background Art

Media (e.g., digital video, audio, combination video and audio, and the like) stream generation and distribution systems (e.g., cable systems) use keyed encryption and decryption to provide security to the media stream content (e.g., to reduce or prevent unauthorized use of or intrusion upon the media streams). Conventional products that are used to provide management of the encryption/decryption keys are generally unwieldy and expensive to implement and use.

In a typical, conventional media stream conditional access system (CAS), Category Keys or Session Keys are used to decrypt Entitlement Control Messages (ECMs) to obtain a Content Key or Control Word in the media stream. Each media program stream has a unique Content Key or Control Word.

Therefore, it would be desirable to have a system and a method for a reduced hierarchy key management that is lower in cost, easier to implement, and easier to use than conventional approaches.

SUMMARY OF THE INVENTION

The present invention generally provides a system and a method for a reduced hierarchy key management that is lower in cost and easier to implement and easier to use than conventional approaches. The present invention generally provides novel concepts in the ability to securely renew (using role based authentication) and re-configure Key Management products to support both proprietary and non-proprietary systems.

An embodiment of the present invention provides a controller having a media stream decryption engine ("decryption engine"), a first memory (e.g., a content key index table), and a second memory (e.g., a content key list). In operation, the decryption engine receives an encrypted media stream from a headend. The encrypted media stream is encrypted with an encryption key and can be decrypted with a decryption key corresponding to the encryption key. The decryption key can be determined from a selected content key. The decryption engine receives with the encrypted media stream an identifier indicative of the selected content key from the headend without receiving with the encrypted media stream either the decryption key or the selected content key.

The first memory contains a plurality of indexes received from the headend prior to the encrypted media stream being received by the decryption engine. Each index respectively corresponds to an identifier with one of the indexes corresponding to the identifier indicative of the selected content key. The second memory contains a plurality of content keys received from the headend prior to the encrypted media stream being received by the decryption engine. The plurality of content keys correspond to the indexes with one of the content keys corresponding to the index which corresponds to the identifier indicative of the selected content key.

The decryption engine selects from the first memory the index corresponding to the identifier indicative of the selected content key in response receiving the encrypted media stream. The decryption engine determines from the second memory the selected content key from the selected index. The decryption engine determines the decryption key from the selected content key and then decrypts the encrypted media stream with the decryption key.

Another embodiment of the present invention provides a method. The method includes receiving at a controller an encrypted media stream from a headend remote from the controller. The encrypted media stream is encrypted with an encryption key and can be decrypted with a decryption key corresponding to the encryption key. The decryption key can be determined from a selected content key. The method further includes receiving at the controller with the encrypted media stream an identifier indicative of the selected content key from the headend without receiving with the encrypted media stream either the decryption key or the selected content key. The method further includes receiving at the controller a plurality of indexes and a plurality of content keys from the headend prior to receiving the encrypted media stream. Each index respectively corresponds to an identifier with one of the indexes corresponding to the identifier indicative of the selected content key. The plurality of content keys correspond to the indexes with one of the content keys corresponding to the index which corresponds to the identifier indicative of the selected content key. The method includes selecting by the controller the index corresponding to the identifier indicative of the selected content key in response receiving the encrypted media stream. The method includes determining by the controller the selected content key using the selected index and determining by the controller the decryption key from the selected content key. The method includes decrypting by the controller the encrypted media stream with the decryption key.

Another embodiment of the present invention provides a system having a headend and a controller remotely located from the headend. The headend encrypts a media stream with an encryption key to generate an encrypted media stream. The encrypted media stream is encrypted with an encryption key and can be decrypted with a decryption key corresponding to the encryption key. The decryption key can be determined from a selected content key. The headend transmits the encrypted media stream with an identifier indicative of the selected content key to the controller without transmitting with the encrypted media stream either the decryption key or the selected content key. Prior to transmitting the encrypted media stream with the identifier to the controller, the headend transmits a plurality of indexes and a plurality of content keys to the controller. Each index respectively corresponds to an identifier with one of the indexes corresponding to the identifier indicative of the selected content key. The plurality of content keys correspond to the indexes with one of the content keys corresponding to the index which corresponds to the identifier indicative of the selected content key. The controller selects the index corresponding to the identifier indicative of the selected content key in response receiving the encrypted media stream, determines the selected content key from the selected index, determines the decryption key from the selected content key, and decrypts the encrypted media stream with the decryption key.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1A:
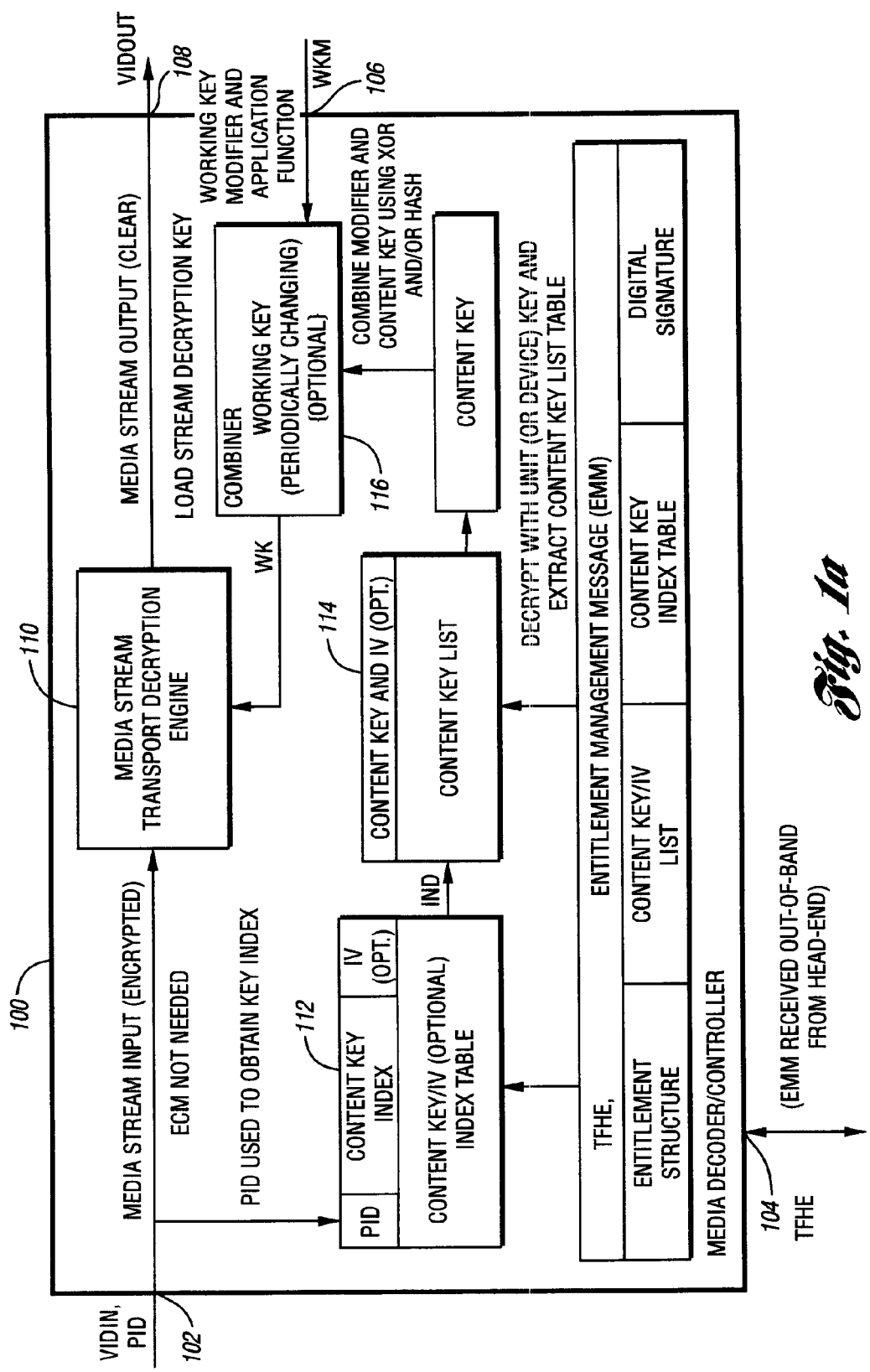
FIGS. 1(a-d) are diagrams of media stream decoders of the present invention.

Terms used to describe the present invention are defined as follows:

AES: Advanced Encryption Standard. AES is generally a much more secure algorithm to use for the storing of digital content in a digital video recording when compared to DES. The standard key length used for AES is 128 bits.

DES: Data Encryption Standard. A fixed-key-length security algorithm that employs 56-bit length keys. Any 56-bit number can be implemented as a DES key. The relatively short key length renders DES vulnerable to brute-force attack wherein all possible keys are tried one by one until the correct key is encountered (i.e., the key is "broken").

Electronic Code Block (Mode): ECB, In ECB the message is divided into 64-bit blocks, and each block is encrypted separately. Encryption is independent for each block.

Entitlement Control Message (Stream): ECM, Messages that generally define access requirements of a program, specify the tiers required for subscription, and the cost associated with impulse purchase of the program. The index may be delivered in the ECM as a reference to the content key. Encrypted program keys may be delivered in the ECM stream.

Entitlement Management Message (Stream): EMM, Messages that define access rights for each individual decoder. The EMM stream is processed with the access control device, however, the user processor buffers EMMs and feeds them to the access control device via an interface.

Hash: A function (or process) that converts an input (e.g., the input stream) from a large domain into an output in a smaller set (i.e., a hash value, e.g., the output stream). Various hash processes differ in the domain of the respective input streams and the set of the respective output streams and in how patterns and similarities of input streams generate the respective output streams. One example of a hash generation algorithm is Secure Hashing Algorithm-1 (SHA-1). Another example of a hash generation algorithm is Message Digest 5 (MD5). The hash may be generated using any appropriate algorithm to meet the design criteria of a particular application.

Headend: The control center of a cable television system, where broadcast signals are received and distributed. The headend generally contains antennas, preamplifiers, frequency converters, demodulators, encoders, compressors, automatic switching equipment and other related equipment that receives, amplifies, filters, encrypts, encodes, and converts incoming satellite and terrestrial streams for presentation to distribution channels.

Initialization vector: IV, An initialization vector in a block cipher is a block of bits that is combined with the first block of data in any of several feedback modes. The IV will make each ciphertext unique, even when similar plain text is encrypted with the same key in chain block coding (CBC) mode.

Keylist: A list of decoder addresses and respective decoder keys in ordered pairs. Keylists may be used by the Uplink Control System (UCS) for generation of authorization messages that are addressed to the diagnostic circuit that is embedded in decoders that are specific to the encoder system.

Program: A time contiguous collection of motion image information, audio information, or a combination thereof that is transmitted (i.e., presented, broadcast, sent, delivered, etc.) as an entity.

Program Key: An encryption/decryption key that controls access, encryption/decryption, etc. of a particular program.

Triple-DES: (3-DES) Application of DES encryption three times using three different keys or, alternatively, using a first key for the first and third segments of a three segment key and a second key for the middle segment, for a total key bit-width of 112 or 168 bits is also used to protect certain structures and the key inside entitlements.

Unit address: A unique number that identifies and distinguishes one decoder from another. One example of a unit address is a Media Access Control (MAC).

Unit key (or Private key): A key that is unique to a respective decoder. Messages intended for a particular decoder are encrypted using the respective unit key.

Unit keylist: A file that contains unit addresses and respective unit keys.

Uplink Control System (UCS): Software that is used to support the secure delivery of digitally compressed services. The UCS generally provides the capability to authorize and de-authorize individual decoders on an event-by-event basis.

UTC: Universal Time Code

Working key: A low level key that generally changes several times per second. The working key generally has a validity that is equal to or shorter in duration than the program to which it is related. The working key is also referred to as the "control word." In one typical example, the working key changes every 20 to 30 seconds. In one example (e.g., services that do not have a video component), the working key epoch (i.e., the period of time during a program for which a working key is valid) duration may be set at an appropriate time interval. However, any appropriate time for changing the working key may be implemented to meet the design criteria of a particular application. The working key is used to derive the keystream. The working key is generally delivered in an encrypted form with the respective program key.

Working Key File: A file that contains the working keys for the entire program that is encrypted in the program key, generally in chronological order.

The reduced hierarchy key management of the present invention generally provides a system and method for renewable and re-configurable security for delivering Entitlement Management Messages (EMM's), Entitlement Control Messages (ECM's), Content Keys, and the associated keys. In a typical Conditional Access System (CAS), Category Keys or Session Keys (decrypted from the EMM) are used to decrypt the ECM to obtain the Content Key or a Control Word in the video stream. Each media stream (e.g., video program stream) generally has a unique Content Key or Control Word. The reduced hierarchy key management of the present invention generally uses a highly secure method to deliver a set of symmetric keys such as triple-DES or AES (which can be protected using one or more mutually defined algorithms and data such as one way (e.g., SHA-1, MD5, and the like) hashing and Exclusive OR (EXOR) operations as part of the EMM for all program media streams. ECB modes of AES, DES or triple-DES do not require an initialization vector (IV) while CBC modes do require an IV. The system and method of the present invention may optionally (i.e., alternatively) include an IV that may be indexed and selected if CBC mode is used for the algorithm chosen.

Both the headend delivering the key list and the receiving device may be able to receive encrypted data and obtain the clear-text keys. An index table is also generally delivered for referencing each of the delivered keys. The EMM updates can generally be used solely to deliver the entitlements after the first table is sent. In one example, the reduced hierarchy of the present invention can obtain a key index by using a program identifier (PID). In another example, the reduced hierarchy of the present invention can obtain a key index via a session ID such as a Video On Demand (VOD) Session ID. The key index is generally used to determine the index which references one or more related content keys.

The key index is generally used to obtain the key (and alternatively an IV) when Cipher Block Chaining mode is used. The index table can be updated as a countermeasure in lieu of sending new keys for each new EMM. The number of keys can be less than the total number of program streams and content keys because some streams can be derived mathematically from combinations of other keys. In other cases, entire service tiers can be on the same general key and derivative keys may be generated for each program stream in the respective tier. The system and method of the present invention may eliminate the delivery and management of Category or Session Keys and the related ECMs from the headend.

For VOD services, a table of keys can be generated and delivered at session setup time. The keys for VOD service may be delivered with synchronization information related to key change as well as other information for short term working key epochs. A VOD Session ID or, alternatively, a Program ID may be used as an index to reference the keys list with the appropriate record of information for the VOD transport decryption. In alternative embodiments of reduced hierarchy key management of the present invention, one-way hashing may be implemented in the protection, selection and processing of the decryption key.

The reduced hierarchy key management of the present invention generally provides a new, more secure, and elegant system and method to deliver content keys for decrypting the program streams in conditional access systems (e.g., Broadcast and Video On Demand applications). The key management of the present invention may dramatically reduce the complexity required to deliver new content keys when a first Entitlement Message has been sent (i.e., presented, transmitted, provided, broadcast, etc.) to each set top box. The reduced hierarchy key management system and method of the present invention may be implemented as a portion of a new CAS system. The new CAS system generally provides for the manufacture and distribution of devices that are compatible with infrastructure, regardless of specific content security mechanisms that are used in that infrastructure. The new CAS system may provide far more efficient manufacturing, distribution and operations, and in fact enable new business models, including the retail availability of extremely low cost customer premises equipment (CPE) when compared to conventional approaches.

The reduced hierarchy key management of the present invention provides the user with flexibility and also helps to simplify Impulse Pay Per View (IPPV) and Video On Demand (VOD) security in the headend when compared to conventional approaches. The simplified key management structure of the present invention can be applied to IPPV and VOD technologies and thereby standardize the overall approach to security for VOD.

The commercial value of the unique improved system and method for reduced hierarchy key management of the present invention is potentially very large because the present invention may provide all of the Consumer Electronics (CE) industry to innovate new types of products for multiple system operators (MSOs). Furthermore, all CE companies are potential customers. The present invention may lower the overall cost of producing headends, STBs and digital televisions, lower the cost and ease the operational complexities for IPPV and VOD, thereby providing the MSOs significant cost savings when compared to conventional approaches. Further, by enabling dramatically lower costs as well as increased innovation and new business models, the reduced hierarchy key management of the present invention may improve the competitive position of cable television implementations versus alternative video providers such as Digital Broadcast Satellite (DBS) (i.e., Digital TV transmissions via satellite) and emerging telecommunications-based video systems.

Referring to FIG. 1a, a diagram illustrating a media decoder (i.e., controller, processor, apparatus, circuit, device, etc.) 100 of the present invention is shown. Decoder 100 may be implemented in connection with a digital media stream distribution system (described in more detail in connection with FIGS. 2(a-b)). Controller 100 is generally implemented as a security processor (or processing system) that provides at least one security feature (e.g., encryption, decryption, authentication, security key management, copy protection, digital rights management, etc.) to at least one digital media input/output stream. Decoder 100 generally has an input 102 that receives at least one signal (e.g., VIDIN and PID), an input/output 104 that receives/presents a signal (e.g., TFHE) as well as additional data, signals, messages, and the like, an input 106 that receives a working key modifier and application function signal (e.g., WKM), and an output 108 that presents a signal (e.g., VIDOUT).

The streams VIDIN and VIDOUT may be implemented as digital media streams that may be in an encrypted and in a clear (i.e., unencrypted or decrypted) state (or condition), respectively. The streams VIDIN and VIDOUT are each generally implemented as a digital media signal stream (e.g., an MPEG, MPEG-2, etc. stream or other transport stream). In one example, the stream VIDOUT may be implemented as a decrypted (and decompressed) version of the stream VIDIN. However, the streams VIDIN and VIDOUT may be implemented having any appropriate format and protocol to meet the design criteria of a particular application.

The signal PID may be implemented as a program identifier for the respective program that has been selected by a user (e.g., customer, client, viewer, listener, etc.). The signal TFHE may be implemented as at least one entitlement management message (EMM) that is received from and presented to the headend via an out-of-band (OOB) transmission. The working key modifier and application function (e.g., a factor, an operator, or a combination of a factor and an operator that was applied to the content key to enhance encryption) WKM is generally combined with a content key to generate a working key that is used to decrypt an encrypted media stream (e.g., the stream VIDIN) to generate a clear output media stream (e.g., the media stream VIDOUT).

Controller 100 generally comprises a media stream transport decryption engine 110, a table 112, a list 114, and a combiner 116. Decoder 100 is generally implemented via at least one processor (e.g., microprocessor, controller, etc.) and at least one memory (e.g., random access memory (RAM), read only memory (ROM), NVROM, flash, EPROM, etc.) where one or more processes, routines, engines, lists, tables, etc. may be stored. Engine 110, table 112, list 114, and combiner 116 are generally implemented within the processor and memory of decoder 100.

Engine 110 may have a first input that may receive a stream (e.g., VIDIN) from a headend (described in connection with FIG. 2), an input that may receive a stream decryption working key (e.g., WK), and an output that may present (i.e., transmit, broadcast, send, etc.) a stream (e.g., VIDOUT). Decryption engine 110 may be configured to decrypt (and decompress) the media stream VIDIN and present the clear media stream VIDOUT in response to the working key WK and the media stream VIDIN. The decryption key WK is generally a function of the content key.

Input/output 104 may provide for interfacing that corresponds to (or is related to) entitlement management message (EMM) downloads that are authenticated between the headend (e.g., headend 202, described in more detail in connection with FIGS. 2(a-b)) and media decoder 100. Input/output 104 may further provide for interfacing that corresponds to downloads to the decoder related to at least one of entitlement structure, content keys lists, IV lists, content key index tables, and digital signatures.

Table 112 generally comprises a content key index table. The contents of table 112 are generally loaded from the headend (e.g., via input/output 104). During the downloading from the headend, content key index table 112 may be decrypted and extracted using the respective unit or device key. Table 112 may receive the identifier PID via input 102. Table 112 may present an index (e.g., IND) to content key list 114 in response to the identifier PID based on the respective value in table 112 using a content key index contained therein. In an alternative (i.e., optional) example, table 112 comprises a content key and IV index table.

List 114 generally contains a list of content keys that may be referenced by respective index values (e.g., the index IND). The contents of list 114 may be loaded via input/output 104. List 114 may be configured to present a content key to combiner 116 in response to the respective index IND. The content keys (and, alternatively or optionally, IV values) in list 114 that correspond to a particular encrypted media stream VIDIN are selected from the content key (and, alternatively or optionally, IV) list 114 using an entry in the content key (and, alternatively or optionally, IV) index table 112 that is referenced by the identifier PID that is received from the headend in connection with the encrypted media stream VIDIN. Content keys and IVs that correspond to a particular encrypted media stream are selected from the content key and IV list using the index IND from a content key and IV table that is referenced by the identifier PID that is received from the headend in connection with the encrypted media stream when Cipher Block Chaining is used as the mode of a selected algorithm.

Combiner 116 may be configured to present the working key WK to engine 110 in response to the working key modifier WKM and the content key. Combiner 116 may combine the working key modifier WKM and the content key using at least one of a hash and an exclusive OR (EXOR) operation (i.e., routine, algorithm, process, method, steps, blocks, etc.). In one example (an optional or alternative mode of operation), combiner 116 may be configured to periodically change the working key WK. For example, combiner 116 may change the working key WK every four video display frame times.

The present invention obviates the need for the transmission, receipt, and processing of respective entitlement control messages (ECMs) as are used in conventional approaches. As such, the reduced hierarchy key management of the present invention is lower in cost, easier to implement, and easier to use than conventional approaches.

Figure 1B:
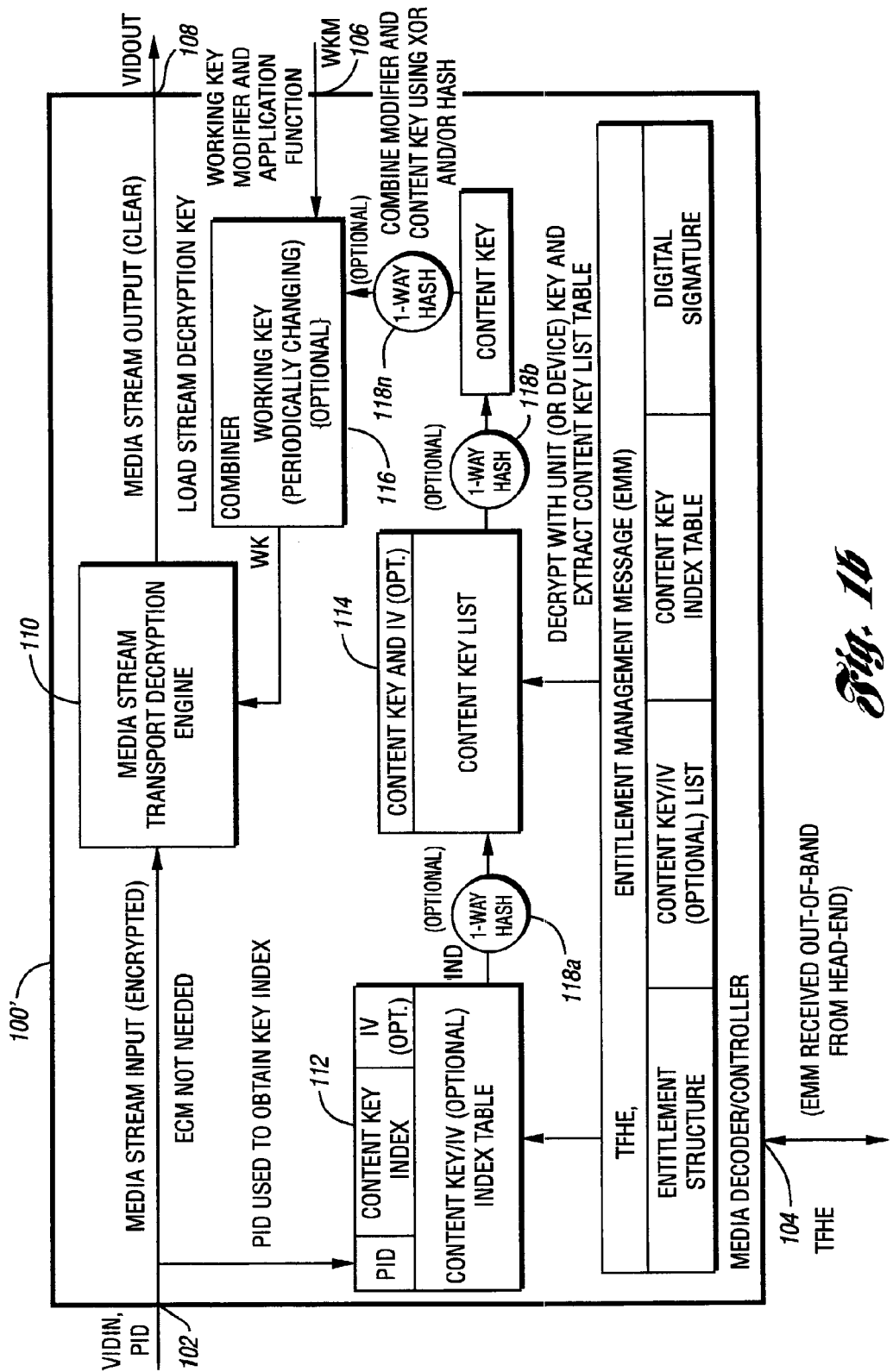

Referring to FIG. 1b, a diagram illustrating an alternative media decoder (i.e., controller, processor, apparatus, circuit, device, etc.) 100' of the present invention is shown. Decoder/controller 100' may be implemented similarly to decoder/controller 100 and may further comprise one or more one-way hash operators 118 (e.g., operators 118a-118n). Hash operators 118 may be configured to provide a one-way hash operation (i.e., process, routine, algorithm, etc.) to at least one of the index IND selected from table 112, the key selected from list 114, and in connection with the modifier WKH to generate the decryption (i.e., working) key WK.

Figure 1C:
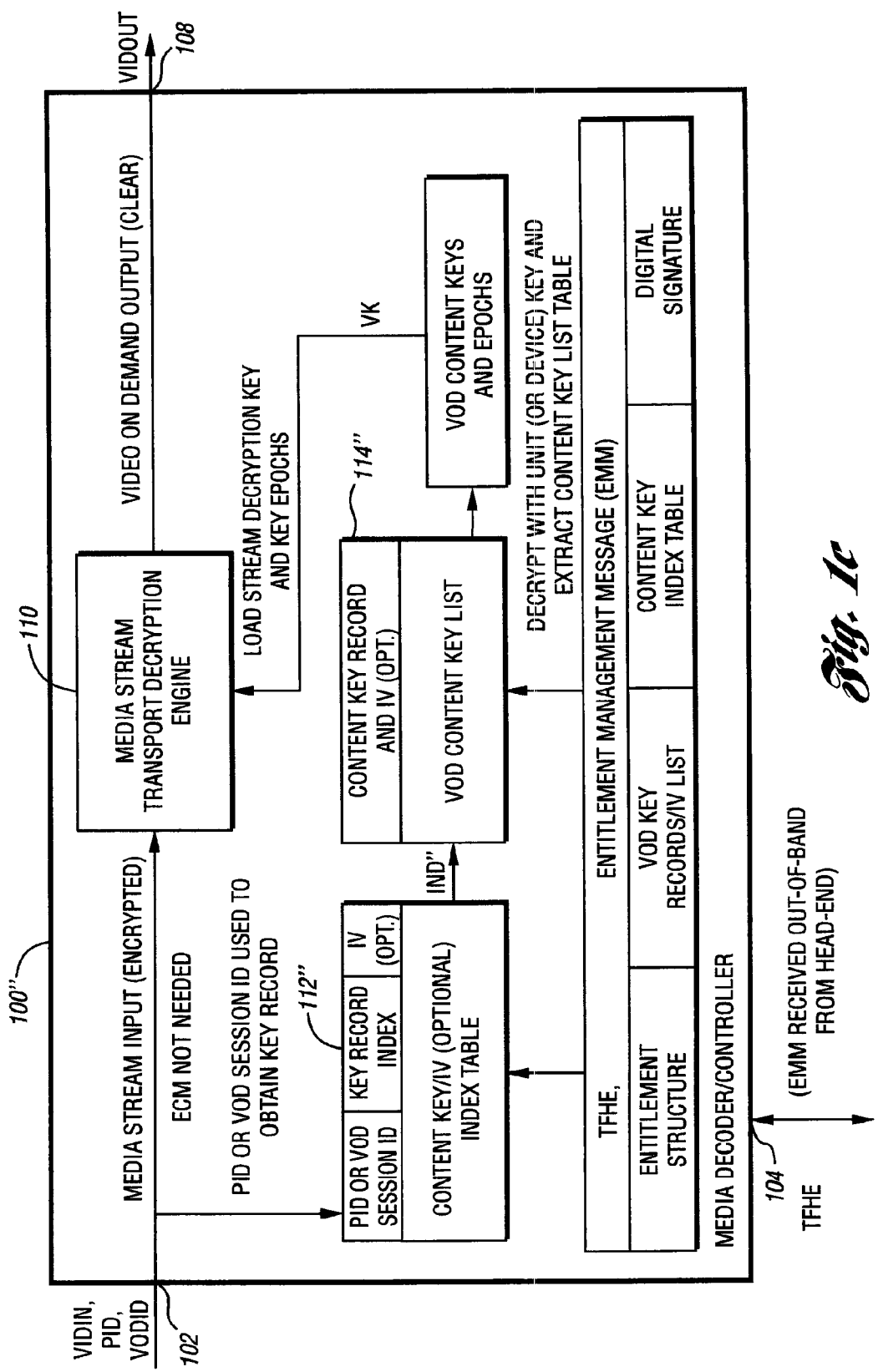
Figure 1B:
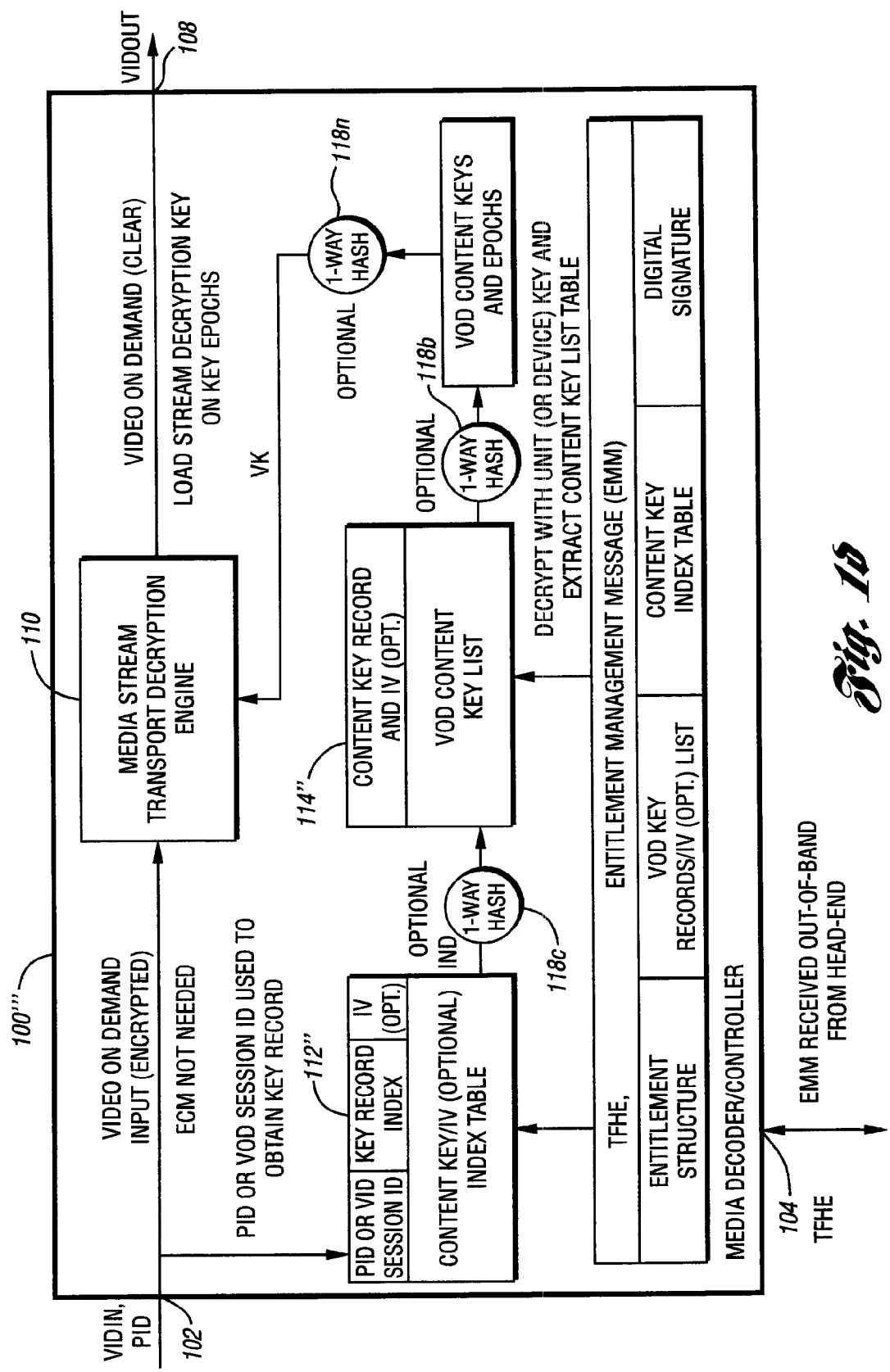

Referring to FIG. 1c, a diagram illustrating an alternative media decoder (i.e., controller, processor, apparatus, circuit, device, etc.) 100" of the present invention is shown. Decoder 100" may be advantageously implemented in connection with video on demand (VOD) key management. The media stream VIDIN may be an encrypted VOD media stream. The media stream VIDOUT may be clear VOD media stream. Input 102 may receive the media stream VIDIN. In one example, input 102 may receive the identifier PID. In another example, input 102 may receive a VOD session identifier (e.g., VODID). Decoder 100" generally does not receive the working key modifier WKM.

Input/output 104 may provide for interfacing that corresponds to (or is related to) EMM downloads that are authenticated between the headend and media decoder 100'. Input/output 104 may further provide for interfacing that corresponds to downloads to the decoder related to at least one of entitlement structure, VOD key records lists, IV lists, content key index tables, and digital signatures.

Controller 100" generally comprises the media stream transport decryption engine 110, a table 112", and a list 114". Decoder/controller 100" is generally implemented without a combiner such as combiner 116 of decoder 100. Engine 110 may receive a video content key (e.g., VK) instead of the working key WK. Engine 110 may generate and present the clear media stream VIDOUT in response to the media stream VIDIN and the decryption key VK.

Table 112" generally comprises a content key (and, alternatively or optionally, IV) index table. The contents of table 112' are generally loaded from the headend (e.g., via input/output 104). Table 112" may receive the identifier PID or, alternatively, the identifier VODID via input 102. Table 112" may present an index (e.g., IND") to content key list 114" in response to the identifier PID or, alternatively, the identifier VODID based on the respective value in table 112" using a key record index contained therein.

List 114" generally contains a list of VOD content keys (e.g., the keys VK) that may be referenced by respective index values (e.g., the index IND"). The contents of list 114" may be loaded via input/output 104. List 114" may be configured to present a content key to engine 110 in response to the respective index IND". The VOD content keys (and, alternatively or optionally, IVs) VK in list 114" that correspond to a particular VOD encrypted media stream VIDIN are selected from the content key (and, alternatively or optionally, IV) table 112" using an entry in the content key record index that is referenced by the identifier PID or, alternatively, the identifier VODID that is received from the headend in connection with the encrypted media stream VIDIN. The stream decryption keys VK are generally presented to engine 110 on respective key epochs.

Referring to FIG. 1d, a diagram illustrating an alternative media decoder (i.e., controller, processor, apparatus, circuit, device, etc.) 100''' of the present invention is shown. Decoder/controller 100''' may be implemented similarly to decoder/controller 100'' and may further comprise the one or more one-way hash operators 118a-118n. Hash operators 118 may be configured to provide a one-way hash operation to at least one of the index IND as selected from table 112'' via list 114'', the key selected from table 112'', and in connection with the decryption (i.e., working key) VK.

Referring to FIG. 2a, a diagram illustrating a media stream processing and distribution system 200 implemented in connection with the present invention is shown. Distribution system 200 generally comprises a headend 202, a network 204, at least one set top box (STB) 206 (generally a plurality of STBs 206a-206n), and at least one respective receiving device (i.e., receiver, transceiver, display device, etc.) 208 (generally a plurality of devices 208a-208n). Distribution system 200 is generally implemented as a media service provider/subscriber system wherein the provider (or vendor) generally operates headend 202 and network 204, and also provides a subscriber (i.e., client, customer, service purchaser, user, etc.) with STB 206.

STB 206 is generally located at the subscriber location (not shown, e.g., home, tavern, hotel room, business, etc.) and receiver 208 is generally provided by the client. Receiver 208 is generally implemented as a television, high definition television (HDTV), monitor, host viewing device, MP3 player, audio receiver, radio, personal computer, media player, digital video recorder, game playing device, etc. Receiver 208 may be implemented as a transceiver having interactive capability in connection with STB 206, headend 202, or both STB 206 and headend 202.

Headend 202 is generally electrically coupled to network 204, network 204 is generally electrically coupled to STB 206, and each STB 206 is generally electrically coupled to the respective receiver 208. The electrical coupling may be implemented as any appropriate hard-wired (e.g., twisted pair, untwisted conductors, coaxial cable, fiber optic cable, hybrid fiber cable, etc.) or wireless (e.g., radio frequency, microwave, infrared, etc.) coupling and protocol (e.g., HomePlug, HomePNA, IEEE 802.11(a-b), Bluetooth, HomeRF, etc.) to meet the design criteria of a particular application. While distribution system 200 is illustrated showing one STB 206 coupled to a respective one receiver 208, each STB 206 may be implemented having the capability of coupling more than one receiver 208 (not shown).

Headend 202 generally comprises a plurality of devices 210 (e.g., devices 210a-210n) that are implemented as amplifiers, pre-amplifiers, data servers, computers, processors, security encryption and decryption apparatuses or systems, and the like configured to provide video and audio data (e.g., movies, music, television programming, and the like), processing equipment (e.g., provider operated subscriber account processing servers), television service transceivers (e.g., transceivers for standard broadcast television and radio, digital television, HDTV, audio, MP3, text messaging, gaming, etc.), media streams, and the like. In one example, headend 202 may generate and present (i.e., transmit, provide, pass, broadcast, send, etc.) the stream VIDIN, the signal TFHE, and the program identification signals PID and VODID.

Network 204 is generally implemented as a media stream distribution network (e.g., cable, satellite, and the like) that is configured to selectively distribute (i.e., transmit and receive) media service provider streams (e.g., standard broadcast television and radio, digital television, HDTV, audio, MP3, text messaging, games, etc.) for example, as the stream VIDIN, the downloads TFHE, and the identifiers PID and VODID, to STBs 206 and to receivers 208, for example, as the stream VIDOUT. The stream VIDIN, the downloads TFHE, and the identifiers PID and VODID are generally distributed based upon (or in response to) subscriber information. For example, the level of service the client has purchased (e.g., basic service, premium movie channels, etc.), the type of service the client has requested (e.g., standard TV, HDTV, interactive messaging, video on demand, pay-per-view, impulse-pay-per-view, etc.), and the like may determine the media streams that are sent to (and received from) a particular subscriber.

STB 206 is generally implemented as an STB having multiple stream capability (e.g., standard broadcast television and radio, digital television, audio, MP3, high definition digital television (HDTV), text messaging, etc.). STB 206 generally comprises at least one respective media decoder (e.g., an appropriate one of decoders (controllers) 100, 100', 100'' and 100'''). STB 206 may receive encrypted (and compressed) video and audio data (e.g., the stream VIDIN), the EMM signal and downloads TFHE, and the id signals PID and VODID, present the EMM signal TFHE to the headend 202 via network 204, and present clear video and audio data (e.g., the stream VIDOUT) to receiver 208.

Figure 2B:
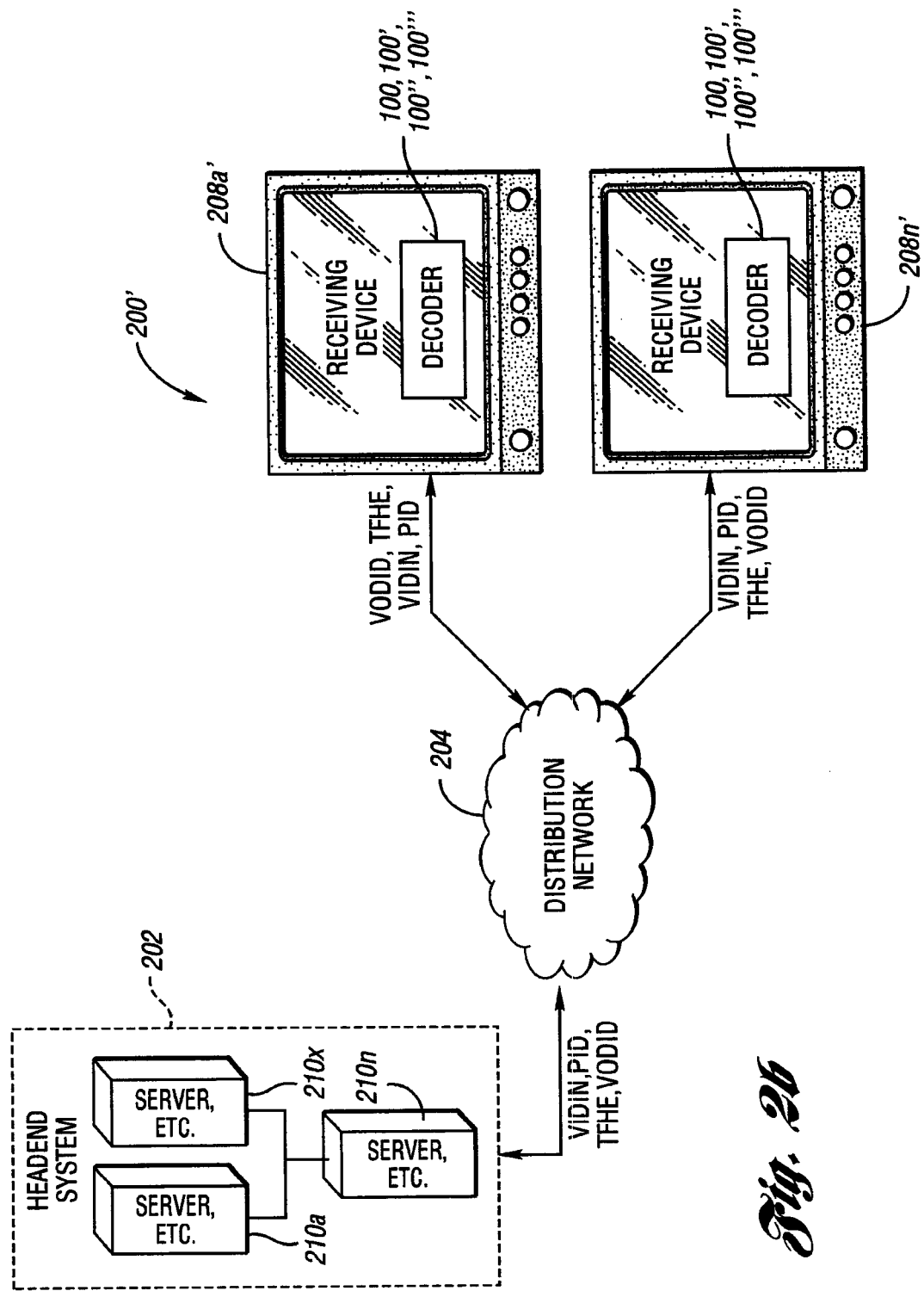
FIGS. 2(a-b) are diagrams of media processing and delivery systems implementing the present invention.

Referring to FIG. 2b, a diagram illustrating a media stream processing and distribution system 200' implemented in connection with the present invention is shown. Distribution system 200' generally comprises headend 202, network 204, and at least one of receiving device (i.e., receiver, transceiver, etc.) 208' (generally a plurality of the devices 208a'-208n'). Receiver 208' is generally coupled directly to network 204 and receives the stream VIDIN, the signal TFHE, and the program identification signals PID and VODID, and receives and presents the EMM signal TFHE. Receiver 208' generally comprises at least one respective media decoder (e.g., an appropriate one of decoders (controllers) 100, 100', 100'' and 100''').

In yet another example (not shown), system 200' may be implemented having at least one STB 206 coupled to network 204 and with at least one receiver 208 coupled thereto, as well as having at least one receiver 208' that is directly coupled to network 204.

As is readily apparent from the foregoing description, then, the present invention generally provides an improved system (e.g., decoders 100 and 100') and an improved method for a reduced hierarchy key management that is lower in cost, easier to implement, and easier to use than conventional approaches.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A controller comprising:
digital circuitry configured to receive an encrypted media stream from a provider, wherein the encrypted media stream is encrypted with an encryption key and is configured to be decrypted with a decryption key corresponding to the encryption key, wherein the decryption key is configured to be determined from a selected content key;
wherein the digital circuitry is configured to receive with the encrypted media stream an identifier indicative of the selected content key from the provider without receiving with the encrypted media stream either the decryption key or the selected content key;

a first non-transitory memory including a plurality of indexes received from the provider prior to the encrypted media stream being received by the digital circuitry, wherein each index respectively corresponds to an identifier, with one of the indexes corresponding to the identifier indicative of the selected content key; and a second non-transitory memory including a plurality of content keys received from the provider prior to the encrypted media stream being received by the digital circuitry, wherein the plurality of content keys correspond to the plurality of indexes, with one of the content keys corresponding to the index which corresponds to the identifier indicative of the selected content key;

wherein the digital circuitry is configured to select from the first non-transitory memory the index corresponding to the identifier indicative of the selected content key in response to receiving the encrypted media stream;

wherein the digital circuitry is configured to determine from the second non-transitory memory the selected content key using the selected index;

wherein the digital circuitry is configured to determine the decryption key from the selected content key and decrypt the encrypted media stream with the decryption key.

2. The controller of claim 1 wherein:
the first non-transitory memory includes a content key index table which contains the plurality of indexes.

3. The controller of claim 1 wherein:
the second non-transitory memory includes a content key list which contains the plurality of content keys.

4. The controller of claim 1 wherein:
the digital circuitry, the first non-transitory memory, and the second non-transitory memory are part of a set-top-box.

5. The controller of claim 1 wherein:
the identifier indicative of the selected content key is a program identifier.

6. The controller of claim 1 wherein:
the identifier indicative of the selected content key is a video-on-demand identifier.

7. The controller of claim 1 wherein:
the first non-transitory memory receives the plurality of indexes from the provider in an entitlement management message downloaded from the provider to the first non-transitory memory prior to the encrypted media stream being received by the digital circuitry.

8. The controller of claim 1 wherein:
the second non-transitory memory receives the plurality of content keys from the provider in an entitlement management message downloaded from the provider to the second memory prior to the encrypted media stream being received by the digital circuitry.

9. The controller of claim 1 wherein:
determining the decryption key from the selected content key includes determining the decryption key from the selected content key and a working key modifier.

10. The controller of claim 9 wherein:
the digital circuitry is configured to determine the decryption key from the selected content key and the working key modifier using at least one of an exclusive OR (EXOR) and a hashing operator.

11. The controller of claim 1 wherein:
the plurality of indexes comprises a plurality of initialization vector ("IV") values and the plurality of content keys comprises initialization vectors.

12. A method comprising:
receiving at a microprocessor an encrypted media stream from a provider remote from the microprocessor, wherein the encrypted media stream is encrypted with an encryption key and is configured to be decrypted with a decryption key corresponding to the encryption key, wherein the decryption key is configured to be determined from a selected content key;

receiving at the microprocessor with the encrypted media stream an identifier indicative of the selected content key from the provider without receiving with the encrypted media stream either the decryption key or the selected content key;

receiving at the microprocessor a plurality of indexes from the provider prior to receiving the encrypted media stream, wherein each index respectively corresponds to an identifier, with one of the indexes corresponding to the identifier indicative of the selected content key;

receiving at the microprocessor a plurality of content keys from the provider prior to receiving the encrypted media stream, wherein the plurality of content keys corresponds to the plurality of indexes, with one of the content keys corresponding to the index which corresponds to the identifier indicative of the selected content key;

selecting by the microprocessor the index corresponding to the identifier indicative of the selected content key in response to receiving the encrypted media stream;

determining by the microprocessor the selected content key using the selected index;

determining by the microprocessor the decryption key from the selected content key; and decrypting by the microprocessor the encrypted media stream with the decryption key.

13. The method of claim 12 wherein:
receiving at the microprocessor the plurality of indexes from the provider prior to receiving the encrypted media stream includes receiving at the microprocessor the plurality of indexes from the provider in an entitlement management message downloaded from the provider to the microprocessor prior to receiving the encrypted media stream.

14. The method of claim 12 wherein:
receiving at the microprocessor the plurality of content keys from the provider prior to receiving the encrypted media stream includes receiving at the microprocessor the plurality of content keys from the provider in an entitlement management message downloaded from the provider to the microprocessor prior to receiving the encrypted media stream.

15. A system comprising:
one or more servers at a provider operation location; and
a client device remotely located from the provider operation location;

wherein a media stream is encrypted at the provider operation location with an encryption key to generate an encrypted media stream, wherein the encrypted media stream is configured to be decrypted with a decryption key corresponding to the encryption key, wherein the decryption key is configured to be determined from a selected content key;

wherein the encrypted media stream is transmitted with an identifier indicative of the selected content key from the provider operation location to the client device without transmitting with the encrypted media stream either the decryption key or the selected content key;

wherein prior to transmitting the encrypted media stream with the identifier to the client device, a plurality of indexes is transmitted from the provider operation location to the client device, wherein each index respectively corresponds to an identifier, with one of the indexes corresponding to the identifier indicative of the selected content key;

wherein prior to transmitting the encrypted media stream with the identifier to the client device, a plurality of content keys is transmitted from the provider operation location to the client device, wherein the plurality of content keys corresponds to the indexes, with one of the content keys corresponding to the index which corresponds to the identifier indicative of the selected content key;

wherein the client device is configured to select the index corresponding to the identifier indicative of the selected content key in response to receiving the encrypted media stream, determine the selected content key using the selected index, determine the decryption key from the selected content key, and decrypt the encrypted media stream with the decryption key.

16. The system of claim 15 further comprising:
a network;
wherein the encrypted media stream is transmitted with an identifier, the plurality of indexes, and the plurality of content keys from the provider operation location over the network to the client device.

17. The system of claim 15 wherein:
the client device is a set-top-box.

18. The system of claim 15 wherein:
the client device is located at a consumer location remote from the provider operation location.

19. The system of claim 15 wherein:
the plurality of indexes is transmitted from the provider operation location to the client device in an entitlement management message prior to transmitting the encrypted media stream with the identifier to the client device.

20. The system of claim 15 wherein:
the plurality of content keys is transmitted from the provider operation location to the client device in an entitlement management message prior to transmitting the encrypted media stream with the identifier to the client device.

21. A controller comprising:
a microprocessor,
a memory storing executable instructions, which when executed by the microprocessor, cause the controller to provide:
 a decryption engine for receiving an encrypted media stream from a provider, wherein the encrypted media stream is encrypted with an encryption key and is configured to be decrypted with a decryption key corresponding to the encryption key, wherein the decryption key is configured to be determined from a selected content key,
 wherein the decryption engine receives with the encrypted media stream an identifier indicative of the selected content key from the provider without receiving with the encrypted media stream either the decryption key or the selected content key;
a first memory including a plurality of indexes received from the provider prior to the encrypted media stream being received by the decryption engine, wherein each index respectively corresponds to an identifier, with one of the indexes corresponding to the identifier indicative of the selected content key; and
a second memory including a plurality of content keys received from the provider prior to the encrypted media stream being received by the decryption engine, wherein the plurality of content keys correspond to the indexes, with one of the content keys corresponding to the index which corresponds to the identifier indicative of the selected content key;

wherein the decryption engine selects from the first non-transitory memory the index corresponding to the identifier indicative of the selected content key in response to receiving the encrypted media stream;

wherein the decryption engine determines from the second non-transitory memory the selected content key using the selected index;

wherein the decryption engine determines the decryption key from the selected content key and decrypts the encrypted media stream with the decryption key.

22. The controller of claim 21 wherein:
the first non-transitory memory includes a content key index table which contains the plurality of indexes.

23. The controller of claim 21 wherein:
the second non-transitory memory includes a content key list which contains the plurality of content keys.

24. The controller of claim 21 wherein:
the decryption engine, the first non-transitory memory, and the second non-transitory memory are part of a set-top-box.

25. The controller of claim 21 wherein:
the identifier indicative of the selected content key is a program identifier.

26. The controller of claim 21 wherein:
the identifier indicative of the selected content key is a video-on-demand identifier.

27. The controller of claim 21 wherein:
the first non-transitory memory receives the plurality of indexes from the provider in an entitlement management message downloaded from the provider to the first non-transitory memory prior to the encrypted media stream being received by the decryption engine.

28. The controller of claim 21 wherein:
the second non-transitory memory receives the plurality of content keys from the provider in an entitlement management message downloaded from the provider to the second memory prior to the encrypted media stream being received by the decryption engine.

29. The controller of claim 21 wherein:
determining the decryption key from the selected content key includes the decryption engine determining the decryption key from the selected content key and a working key modifier.

30. The controller of claim 29 wherein:
the decryption engine determines the decryption key from the selected content key and the working key modifier using at least one of an exclusive OR (EXOR) and a hashing operator.

31. The controller of claim 21 wherein:
the plurality of indexes comprises a plurality of initialization vector ("IV") values and the plurality of content keys comprises initialization vectors.

* * * * *